United States Patent
Baldan

(10) Patent No.: US 8,588,756 B2
(45) Date of Patent: Nov. 19, 2013

(54) METHOD AND SYSTEM FOR UPDATING APPLICATIONS IN MOBILE COMMUNICATIONS TERMINALS

(75) Inventor: Simone Baldan, Rome (IT)

(73) Assignee: Telecom Italia S.p.A., Milan (IT)

( * ) Notice: Subject to any disclaimer, the term of this patent is extended or adjusted under 35 U.S.C. 154(b) by 315 days.

(21) Appl. No.: 12/085,702

(22) PCT Filed: Nov. 30, 2005

(86) PCT No.: PCT/EP2005/012767
§ 371 (c)(1),
(2), (4) Date: Aug. 28, 2009

(87) PCT Pub. No.: WO2007/062673
PCT Pub. Date: Jun. 7, 2007

(65) Prior Publication Data
US 2009/0305687 A1    Dec. 10, 2009

(51) Int. Cl.
*H04M 3/00*       (2006.01)
*G06F 12/14*      (2006.01)

(52) U.S. Cl.
USPC ........ 455/419; 455/414.1; 455/418; 455/558; 235/380; 235/375; 709/228; 709/219

(58) Field of Classification Search
USPC ............... 455/419, 414.1, 418, 558; 235/380, 235/375; 709/228, 219
See application file for complete search history.

(56) References Cited

U.S. PATENT DOCUMENTS

| | | | |
|---|---|---|---|
| 7,047,558 B1 * | 5/2006 | Mariana | 726/3 |
| 7,895,663 B1 * | 2/2011 | Rao et al. | 726/27 |
| 2004/0176080 A1 * | 9/2004 | Chakravorty et al. | 455/414.1 |
| 2005/0063242 A1 * | 3/2005 | Ren | 365/222 |
| 2005/0246703 A1 | 11/2005 | Ahonen | |

FOREIGN PATENT DOCUMENTS

| | | |
|---|---|---|
| EP | 1 303 097 A2 | 4/2003 |
| EP | 1 303 099 | 4/2003 |
| EP | 1 331 559 A2 | 7/2003 |
| EP | 0 947 907 B1 | 9/2003 |
| EP | 1 372 063 A1 | 12/2003 |
| EP | 1 429 569 A1 | 6/2004 |
| EP | 1 443 379 A2 | 8/2004 |
| WO | WO 99/04583 | 1/1999 |

OTHER PUBLICATIONS

"SCWS Architecture," Draft Version 0.1, Open Mobile Alliance (OMA), OMA-AD-SCWS-V0_1-20050622-D, pp. 1-25, (2005).
"Smartcard Wev Server Requirements," Open Mobile Alliance (OMA), Candidate Version 1.0, XP002400995, URL:http://member.openmobilealliance.org/ftp/Public_documents/SEC/SCT/Permanent_documents/>, pp. 1-23, (2005).
"Smartcard Web Server Requirements," Draft Version 1_0, OMA, OMA-RD_Smartcard_Web_Server-V1_0-20050715-D, pp. 1-22, (2005).

* cited by examiner

Primary Examiner — Meless N Zewdu
Assistant Examiner — Jean Chang
(74) Attorney, Agent, or Firm — Finnegan, Henderson, Farabow, Garrett & Dunner, L.L.P.

(57) ABSTRACT

A method is disclosed for checking updates of a software application installed in a wireless communications terminal adapted to be used in a wireless communications network in combination with a subscriber identity module. In the subscriber identity module, a web server function adapted to interact with the software application installed in the wireless communications terminal is provided. When an update of the software application is available, the wireless communications terminal is notified, so that information about availability of the update is made available to the web server function. The software application sends at least one update availability request to the web server function in the subscriber identity module, in order to check if an update is available.

20 Claims, 3 Drawing Sheets

METHOD AND SYSTEM FOR UPDATING APPLICATIONS IN MOBILE COMMUNICATIONS TERMINALS

CROSS REFERENCE TO RELATED APPLICATION

This application is a national phase application based on PCT/EP2005/012767, filed Nov. 30, 2005, the content of which is incorporated herein by reference.

FIELD OF THE INVENTION

The present invention generally relates to the field of wireless communications; in particular, the invention concerns the updating of software applications installed on wireless communications terminals. Specifically, the invention proposes a new method for efficiently updating anti-malware software in wireless communications terminals.

DESCRIPTION OF RELATED ART

Wireless communications terminals, e.g. mobile phones, have increased in the years their data processing capabilities, in order to be able to support richer services in addition to enabling plain inter-personal communications; on another hand, previous portable data processing devices like Personal Digital Assistants (PDAs) have been enhanced with wireless communications capabilities. As a consequence, many wireless communications terminals can nowadays be regarded as real data processing systems, like Personal Computers (PCs), and the trend is towards further increase of their processing power. As any other data processing system, wireless communications terminals now allow installation of software applications adapted to manage several services to the users.

As an undesirable side effect, wireless communications terminals, like any other data processing apparatus, have become targets for attacks carried out by computer viruses and malware (word that translates "malicious software") in general.

For this reason, anti-viruses and malware scanners in general (hereinafter globally referred to as "anti-malware software") have thus been designed and put into commerce, adapted to protect wireless communications terminals from contamination threats.

Due to the continuous and fast creation of new threatening malware, as in the case of PCs, for the effective protection of the wireless communications terminals it is essential that the anti-malware software installed therein is regularly and frequently kept updated, in order to update the list of threatens (e.g., the list of virus signatures, malware definition data), and the engines for the detection and, where possible, healing of the infection. Typically, when a new computer virus is created, it initially spreads more or less freely until it is detected and people working for the providers of the anti-malware software find a way to identify and combat the infection, generating a definition of the malware that can be exploited by the scanner engines running on the customers' systems to identify the malware and take the necessary actions to remedy to the infection.

In fixed data processing apparatuses, such as workstations, desktops, or even portable PCs, having a wired, or generally a LAN-type (Local Area Network-type), access to the Internet or to a private (e.g., of an employer) computer network wherein there is a server in charge of distributing the updates, efficient mechanisms for distributing updates of the anti-malware software have been implemented: almost all of the commercially available anti-malware software products use the communications protocols of the IP (Internet Protocol) and Web world (Hyper Text Transfer Protocol-HTTP, HTTP Secure-HTTPS, and similar) for carrying out update. Periodically (for example, every day, or every week, or upon connection of the data processing apparatus to the private computer network or to the Internet), an automatic update function of the anti-malware software automatically contacts an anti-malware distribution server, for example of the anti-malware software provider, checks for the presence of available updates, and downloads them.

Solutions for the "Over-The-Air" (OTA) update of the anti-malware software residing on wireless communications terminals have already been proposed.

For example, EP 1 443 379 describes a method wherein virus vaccine programs are timely updated OTA whenever a new version of the vaccine program is available. In particular, two updating methods are described: a network-initiated method and a user-initiated method. The network-initiated update method is executed by a service provider when a new version of the vaccine program is available, or a new virus appears. When the vaccine program is updated in a local database of a Virus Monitoring Unit (VMU) provided in the Mobile Switching Center (MSC) of a mobile telephony network, which VMU is connected through a router to the internet, the VMU sends a vaccine information request message to the mobile terminals; in response thereto, the mobile terminals send vaccine information response messages including the vaccine program information and the capability information. The VMU chooses suitable virus vaccine programs that are stored in the local database according to the vaccine program information and the capability information of the mobile terminals, then sends the selected virus vaccine program to the mobile terminal, thereby updating the virus vaccine program in the mobile terminal. In the user-initiated method a user requests updating of the vaccine program, the mobile terminal sends a vaccine update request message to the VMU including the vaccine program information and the capability information. The VMU chooses a corresponding vaccine program from the database according to the capability of the mobile terminal. Then, the VMU sends the selected virus vaccine program to the mobile terminal, thereby updating the virus vaccine program in the mobile terminal.

In EP 1 303 099 malware definitions are updated via a data channel associated with a wireless telephony link being the same channel used for SMS messaging and the transfer of control information to the mobile data processing device. A provider of malware scanning systems has a server computer connected to the internet and to the public switched telephone network. When a new malware threat is identified, the software provider generates malware definition updating data that needs to be sent to the mobile data processing devices. The server issues appropriate messages addressed by their telephone number to the mobile data processing devices via the internet or via the public switched telephone network. These malware definition updating data messages may be processed in a manner similar to SMS text messages by the SMS service center.

SUMMARY OF THE INVENTION

The Applicant observes that in the known OTA update methods described in the two documents cited above wireless traffic is generated simply for the periodic assessing of the necessity of updating the anti-malware software resident in the mobile communications terminals. Incidentally, the Applicant observes that EP 1 443 379 does not specify the nature of the messages used for updating the virus vaccine program.

The Applicant has tackled the problem of how to ensure adequate updating of software applications, such as anti-malware software, installed and running on a wireless communications terminal.

In particular, the Applicant has tackled the problem of how to implement an efficient, OTA updating procedure, limiting as far as possible the necessary wireless traffic, particularly as far as the assessment of the necessity of an update is concerned, as well as the burden for the wireless communications network, and the costs for the users.

The Applicant has found that this problem can be solved by exploiting a web server function included in the subscriber identity module associated to the wireless communications terminal. The wireless communications terminal receives from the network notifications carrying information related to the availability of an updated version of the software application. The information carried by the notifications is made available to the software application by the web server function, so that the wireless communications terminal does not need a connection to the network only for checking software updates.

According to a first aspect of the invention, a method is provided for checking updates of a software application installed in a wireless communications terminal adapted to be used in a wireless communications network in combination with a subscriber identity module. The method comprises:

providing in the subscriber identity module a web server function, the software application being adapted to interact with the web server function;

when an update of the software application is available, notifying the wireless communications terminal so that information about availability of the update is made available to the web server function;

causing the software application send at least one update availability request to the web server function in the subscriber identity module.

According to a second aspect of the invention, a wireless communications terminal is provided. The terminal is adapted to be used in a wireless communications network, stores at least one software application, interacts with a subscriber identity module. According to the second aspect:

the subscriber identity module comprises a web server function;

the at least one software application is adapted to interact with the web server function;

the terminal is adapted to receive notifications from the wireless communications network related to an availability of updates of the software application;

the software application is adapted to send update availability requests to the web server function.

According to a third aspect, the invention also relates to a wireless communications network comprising the wireless communications terminal of the second aspect.

For the purposes of the present invention, by "web server function" it is intended a server process running at a site, which sends out pages (typically web pages) in response to requests (typically HTTP requests) from remote clients.

BRIEF DESCRIPTION OF THE DRAWINGS

The features and advantages of the present invention will be made clear by the following detailed description of exemplary embodiments thereof, provided merely by way of non-limiting example, description that will be conducted making reference to the annexed drawings, wherein.

DETAILED DESCRIPTION OF EXEMPLARY EMBODIMENTS OF THE INVENTION

Figure 1:
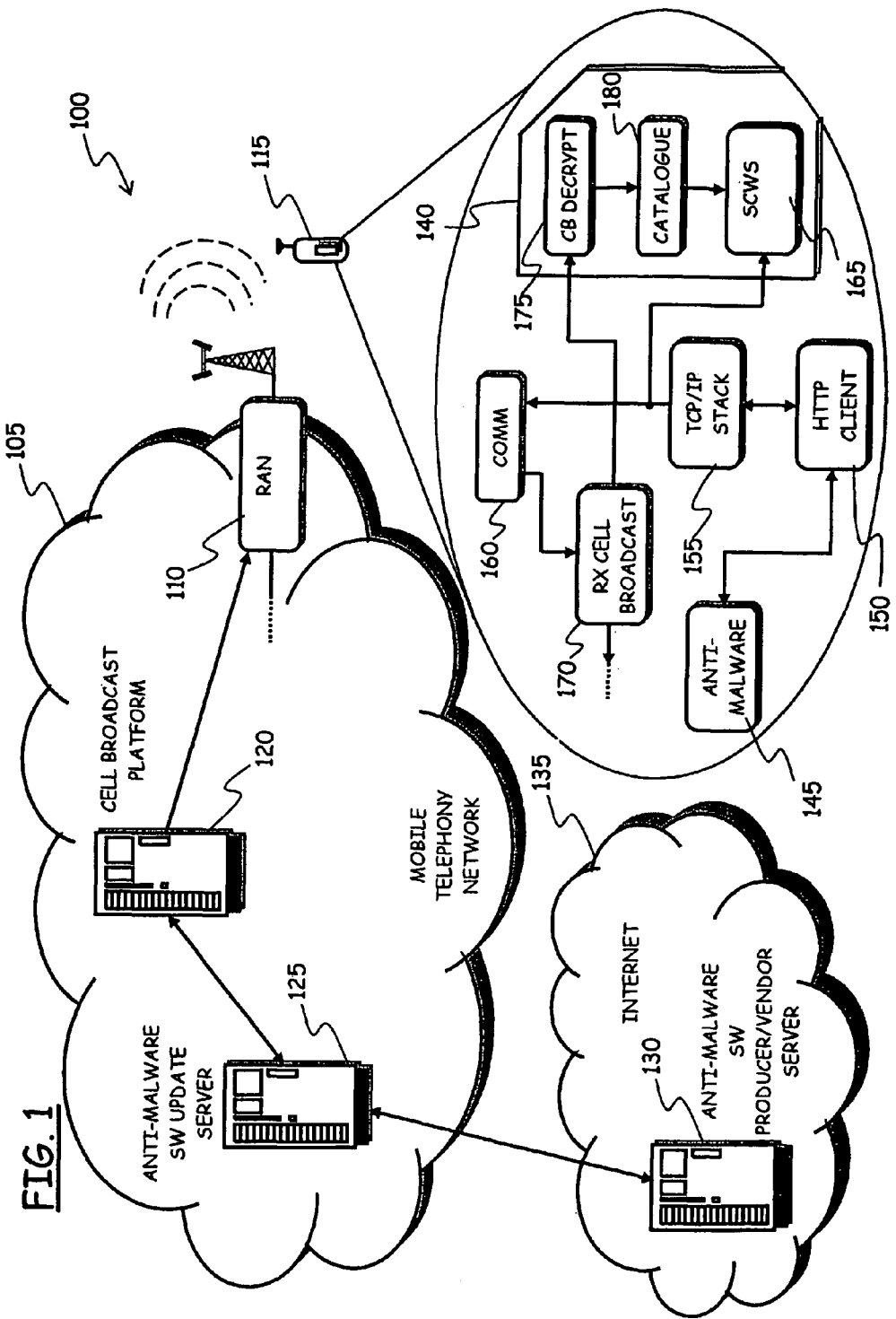
FIG. 1 pictorially shows a system scenario in which a method according to an embodiment of the present invention can be applied.

Referring to the drawings, FIG. 1 shows, schematically and limitedly to the elements essential for the understanding of the invention embodiment being described, the architecture of a system 100 for the distribution of updates of anti-malware software to wireless communications terminals, particularly but not limitedly mobile phones (more generally, data processing devices having wireless communications capabilities, like smart phones and PDAs), according to an embodiment of the present invention.

The system 100 includes a mobile telephony network 105, particularly but not limitatively a second-generation (2G) cellular network, like a GSM network (or a network complying to corresponding standards in different areas of the world), or a third-generation (3G) network like a UMTS network.

In a way per-se known in the art, the mobile telephony network 105 includes a Radio Access Network (RAN) 110 adapted to enable mobile phones, such as the mobile phone 115 shown in the drawing, for access to the mobile telephony network 105. For example, in the case of GSM networks the RAN includes a plurality of Base Station Subsystems (BSSs), each one providing coverage for mobile communications in a respective geographic region and comprising a plurality of Base Transceiver Stations (BTSs) or node-Bs (for the UMTS system), irradiating signals through antennas and covering respective areas ("network cells"), controlled by a same Base Station Controller (BSC), or Radio Network Controller (for the UMTS system). It is pointed out that the specific radio access technology, and thus the specific structure of the RAN 110, is per-se not critical and not limiting to the present invention.

Mobile Switching Centers (MSCs), not shown in the drawing, perform the function of call switching (i.e., routing) from one MSC to another, and/or from/to MSCs of other mobile communications networks, of different network operators (for example, to allow users subscribers of the network 105 to roam in the other mobile communications networks), and/or to the exchanges of one or more wired, Public Switched Telephone Networks (PSTNs).

The mobile telephony network 105 includes a Cell Broadcast (CB) platform 120, operatively coupled to the RAN 110 (for example, to the BSCs, in the case of a GSM network) and implementing a point-to-multipoint message distribution function, by which messages are broadcast to the mobile phones registered in a predetermined broadcast area, for example the area covered by a BSS or RNC of the network. The CB platform 120 is known per se, and is not described in detail; CB messages are for example used to broadcast information such as weather forecasts, traffic conditions, information specific to a certain geographic area, for example to a certain cell, such as an identifier of the cell.

According to an embodiment of the present invention, the CB platform 120 is used for broadcasting (CB) messages carrying information useful to enable a generic mobile phone like the mobile phone 115 recognize an availability of updates of an anti-malware software installed therein. In particular, according to a preferred but not limiting embodiment of the present invention, the CB platform 120 is adapted to broadcast ciphered CB messages, which can be decrypted, and thus exploited, only by some category of users, as it will be discussed later. A broadcasting of encrypted CB messages is for example described in the PCT patent application No. 99/04583.

An anti-malware software update server 125 is provided in the mobile telephony network 105. The anti-malware software update server 125 is operatively connected to the CB platform 120. The anti-malware software update server 125 is also operatively connected to a server 130 of an anti-malware software producer/vendor; for example, the server 130 of the anti-malware software producer/vendor is a server accessible via the Internet 135, e.g. identified by a respective URL (Universal Resource Locator), and it may for example be the server to which also (the anti-malware software installed in the) fixed data processing apparatuses connect for assessing the availability of updates and downloading them, or a different server, dedicatedly set-up for the distribution of anti-malware software for wireless communications terminals.

The generic wireless communications terminal (mobile phone) 115 includes, in addition to conventional elements (receiver, transmitter, whose structure depends on the specific radio access technology) allowing radio communications, a data processing structure in principle not different from that of, e.g., a PC, including: a programmable data processing unit, particularly a microprocessor; dynamic (RAM) and non-volatile (ROM, EPROM, Flash, EEPROM) memory resources, respectively used by the microprocessor as a working memory during the operation, and for storing permanent data as well as a microcode for the bootstrap at power-on, and software applications such as, for example, the anti-malware software; peripherals for the interaction with a human user, such as a display device, a keyboard, a microphone, a loudspeaker. The data processing structure of the wireless communications terminal is adapted to interact with a Subscriber Identity Module (SIM) 140, which is a removable smart-card module having its own data processing and storage capabilities.

In the following description of the wireless communications terminal 115 and of the functionalities thereof according to an embodiment of the present invention, a clear-cut between hardware-implemented and software-implemented functions is intentionally avoided, and it is intended that at least some of the functions that will be described may be implemented in terms of software run by the data processing structure of the wireless communications terminal 115, and/or of software run by the SIM 140.

As schematically shown in FIG. 1, an anti-malware software 145 is assumed to be installed and running in the wireless communications terminal 115. The anti-malware software 145 operates as conventionally known based on a malware definition data catalogue, and a scanning engine; the scanning engine of the anti-malware software 145 may perform periodical scans of the memory resources of the wireless communications terminal 115, like for example the dynamic memory, in search of possible infections, using the malware definition data as a reference for identifying the threats. The anti-malware software 145 also includes a software update functionality, preferably an automatic software update functionality, which launches an update procedure when some predetermined event takes place (for example by initiation of a user, or automatically once a day, or once a week). The software update functionality of the anti-malware software 145 is assumed to operate as in commercially-available anti-malware software products, i.e. as a client of a client-server architecture exploiting standard IP-based protocols like HTTP and/or HTTPS for connecting to an HTTP and/or HTTPS server whose URL is predefined, wherein the software update functionality is instructed to search for possible updates of the anti-malware software.

The (software update functionality of the) anti-malware software 145 comprises or interacts with an HTTP or HTTPS (more generally a web) client 150, installed and running on the wireless communications terminal. The HTTP/HTTPS client 150 practically implements the function of a Web browser, supporting communications through the HTTP/HTTPS protocol and possibly enabling the displaying of HTML (Hyper Text Markup Language) documents (so-called "Web pages"). Through a per-se known stack of ISO OSI layers implementing a TCP/IP (Transmission Control Protocol/Internet Protocol) stack 155, and a communication unit 160, which may be intended as including the radio receiver and the radio transmitter, the HTTP/HTTPS client 150 enables the user of the wireless communications terminal 115 to surf over the Internet, and connect to Web sites.

According to an embodiment of the present invention, the SIM card 140 is adapted to implement a Smart Card Web Server (SCWS). The SCWS, depicted only schematically as a block denoted 165, has an architecture described in the document "SCWS Architecture", Draft 1 Version 0.1-22 June 2005, published by the Open Mobile Alliance (OMA) under the identifier OMA-AD-SCWS-V0_1-20050622-D. This document, and the document "Smartcard Web Server Requirements", Draft 1 Version 1_0-15 Jul. 2005, published by the OMA under the identifier OMA-RD_Smartcard_Web_ Server-V1_0-200550715-D, respectively disclose SCWS architecture and requirements, and are incorporated herein by reference. Essentially, as explained in the first of the two cited OMA documents, the SCWS is an HTTP server running in a smart card hosted by a mobile device (the hosting device); by connecting the SCWS application to the hosting device network stack (e.g., the TCP/IP stack 155 in FIG. 1), the connection by a local browser client, or any other authorized client application is possible without any modification or adaptation of these client software. In other words, the implementation of an SCWS on a smart card like a SIM enables accessing the smart card via an HTTP browser, for accessing services that the SIM card is designed to provide.

The wireless communications terminal 115 further implements a CB message reception functionality, depicted schematically as a block 170, adapted to receive CB messages caused to be broadcasted (at least in the network cell in which the wireless communications terminal is currently registered) by CB platform 120. According to an embodiment of the present invention, the SIM card 140 also implements a CB message receipt management function 175, adapted to decode CB messages caused to be broadcast by the CB platform 120 and related to the anti-malware software, particularly, as described in greater detail in the following, messages carrying information concerning the availability of updates of the anti-malware software 145. In particular, according to an embodiment of the present invention, the CB platform 120 causes the CB messages relating to the anti-malware software to be broadcast in encrypted form, and the CB message receipt management function 175 resident in the SIM card 140 is adapted to decrypt the received CB messages. In this way, the service can be provisioned in a restricted way, only to paying users, despite the exploitation of CB messages which, in principle, are received by every user. The CB messages received allow the SIM card 140 to build a catalogue 180 with a list of identifiers of the last available versions of the anti-malware software 145.

Figure 2A:
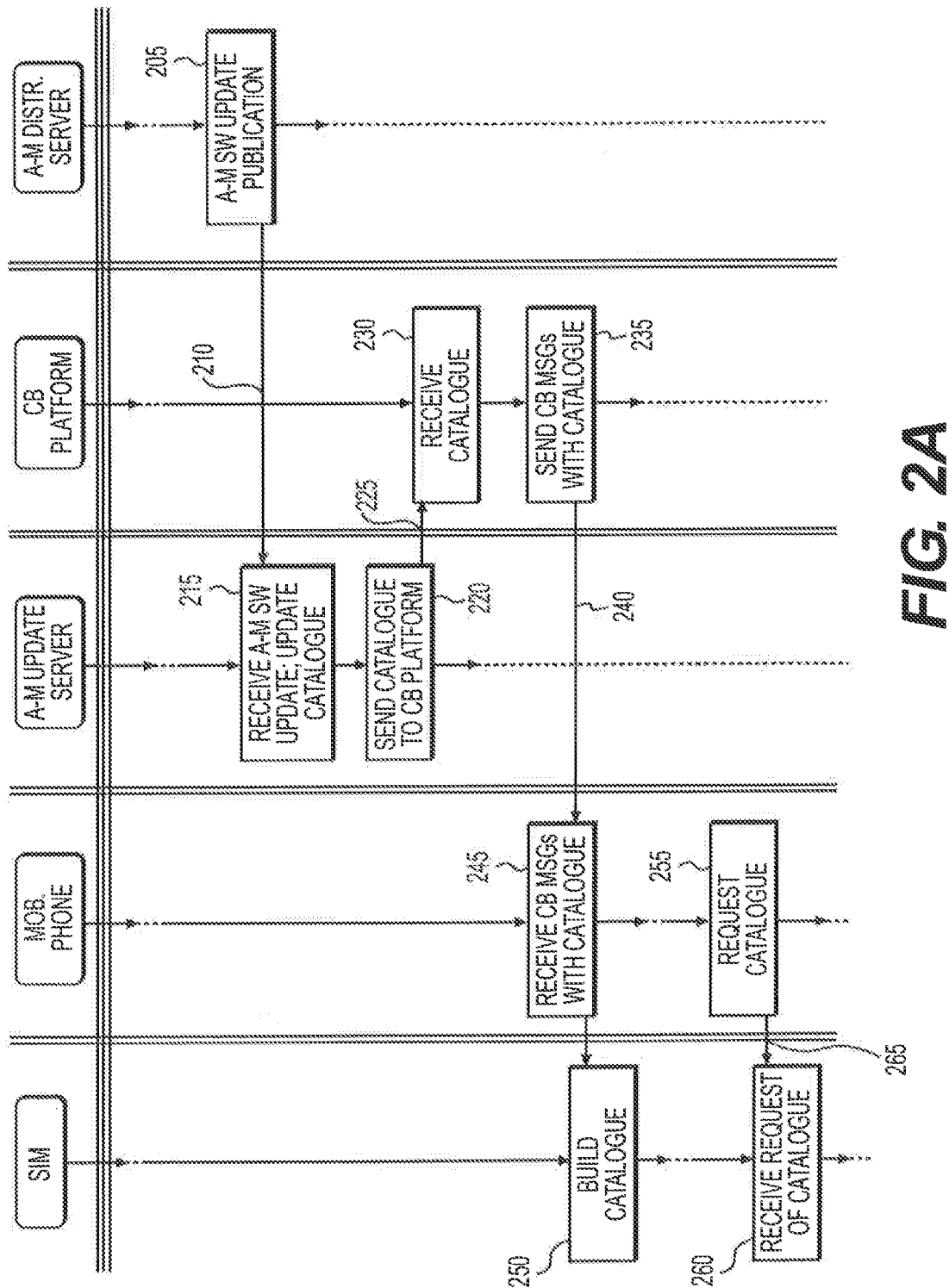
FIGS. 2A and 2B schematically depict a method according to an embodiment of the present invention, in terms of signals/messages exchanged by the various entities involved.
Figure 2B:
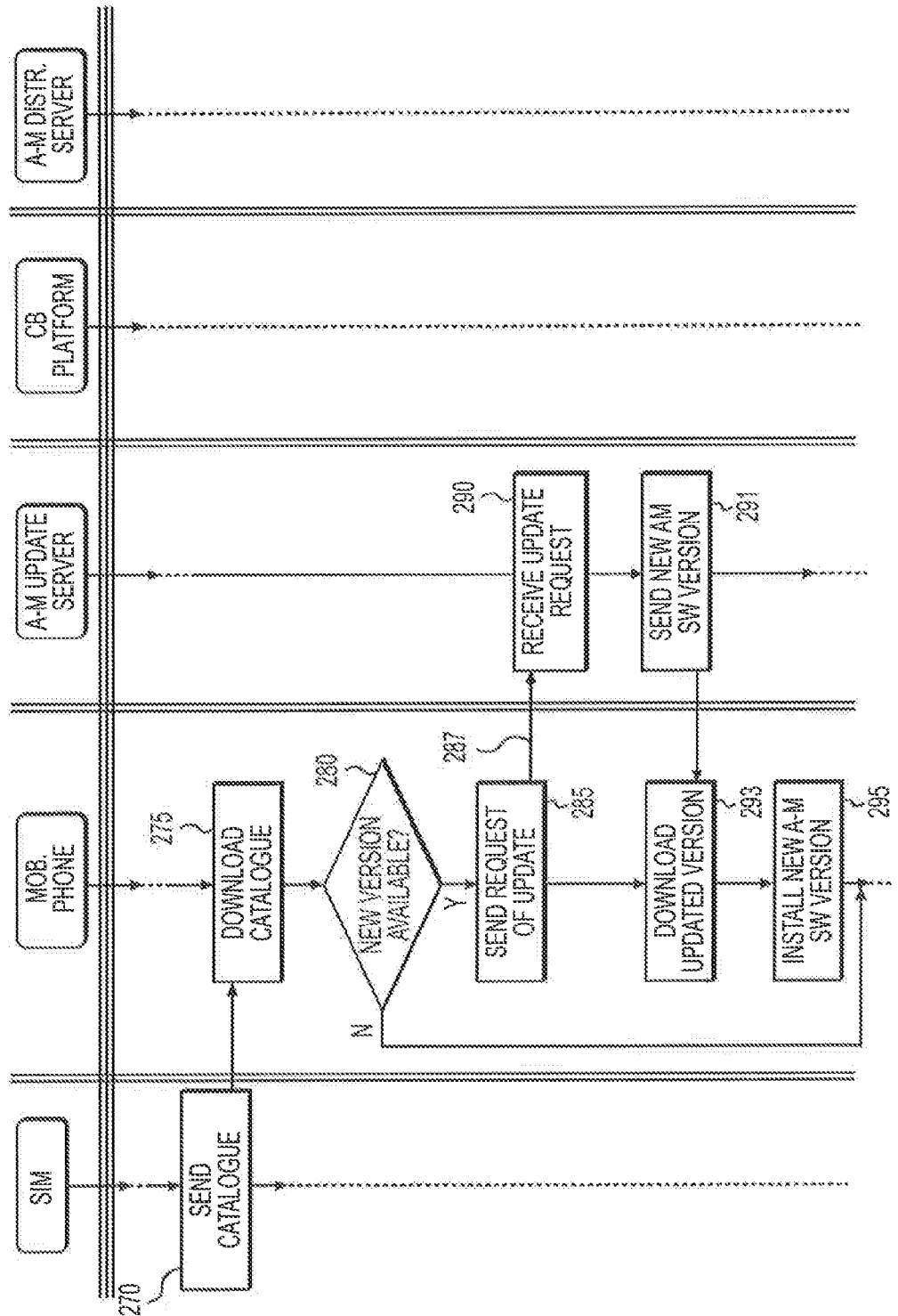

A method according to an exemplary embodiment of the present invention will be now described in detail, with the graphical help of FIGS. 2A and 2B.

Let it be assumed that the user of the wireless communications terminal 115 has subscribed to a service of update of the anti-malware software 145. The specific way the subscription is implemented is not critical to the present invention; for example, the subscription to the anti-malware update service may be made through a sale point, or by phone through a call center, or on-line, through the Internet, for example accessing a Web portal of the network operator, either by means of fixed data processing apparatus or the mobile phone 115, or by sending an SMS. Once the user has subscribed for the service, he/she is provisioned with the SIM card 140 that implements the SCWS 165, as well as the CB message receipt/decryption functionality 175 and the update catalogue build functionality.

Let it be assumed that, in their routinary surveillance, the operators of the anti-malware software producer discover a new computer virus or other threat, i.e. a new malware. As soon as possible, new definition data of the newly detected malware are generated, for example a new computer virus signature, and, possibly, a new, more powerful malware scanner engine (all these cases, and in general any modification to the currently available anti-malware software are referred to as "anti-malware software update", for simplicity).

The anti-malware software producer/vendor, through the respective server 130, publishes the updated version of the anti-malware software (block 205), and distributes the same (signaling 210) to the anti-malware software update server 125 of the mobile telephony network operator. The anti-malware software update server 125 receives the updated version of the anti-malware software (block 215), and stores the same.

The anti-malware software update server 125 updates a catalogue of the anti-malware software versions with the identifier data of the new update, and sends the new catalogue to the CB platform (block 220, signaling 225).

The CB platform 120 receives the updated catalogue of anti-malware software versions (block 230), and manages (block 235) its distribution thereof via at least one CB message 240; preferably, the CB messages are ciphered exploiting an encryption/decryption mechanism (or other known encryption mechanisms) available only to user which have subscribed to the update service. The broadcasting of the CB messages with the new catalogue of anti-malware software versions is conventionally performed, i.e. as for any CB message, and is not described in detail.

The wireless communications terminal 115 (through the CB message reception functionality 170) receives the CB message(s) carrying the new anti-malware catalogue, and forwards them to the CB message receipt/decryption functionality 175 in the SIM 140, which builds the new catalogue (block 250) (possibly, two or more CB messages are needed to transfer a whole new catalogue). In this way, the new catalogue with the available anti-malware versions is made available to the SCWS 165.

When a specific, predetermined event takes place, like for example the change of a day, an automatic update functionality of the anti-malware software 145 checks for available updates of the anti-malware software. In particular, the automatic update functionality of the anti-malware software issues a request of the catalog of the available versions of the anti-malware software. Conventionally, like for example in fixed data processing systems like PCs, the automatic update functionality of the anti-malware software tries to connect, through the Internet, to a Web site managed by a server of the anti-malware software producer/vendor; the URL of the Web site of the anti-malware software producer/vendor may be programmable, but is typically set by default by the producer/vendor of the anti-malware software. Differently, according to an embodiment of the present invention, an URL set in the anti-malware software and identifying the Web site at which the catalogue of the available anti-malware software versions can be retrieved is set to an URL assigned and pointing to the SIM card 140: thus, the SCWS receives (block 260) the request (265) of the anti-malware software versions catalogue issued by the (automatic update functionality of the) anti-malware software 145, so that the request is not forwarded to mobile telephony network 105.

The SCWS makes the catalog 180 available to the anti-malware software (block 270). The anti-malware software 145 downloads the catalogue (block 275) and, based on the received catalogue of available anti-malware software versions, determines whether it is necessary to perform an update (decision block 280). In the negative case (exit branch N of decision block 280), no further action is taken: the check on the availability of updates is repeated the next time the predetermined event takes place (e.g., the day after). If instead the anti-malware software 145 ascertains that a new version thereof is available (exit branch Y of decision block 280), the anti-malware software 145 connects (possibly via the HTTP client 150) to the anti-malware software update server 125 in the mobile telephony network 105, exploiting a predefined URL (possibly included in the received catalogue), and issues (block 285) an update request (287). The update request is received by the anti-malware software update server 125 (block 290), which as a consequence starts a download session of the updated version of the anti-malware software (block 291). The HTTP client 150 downloads the updated anti-malware software version (block 293), which is finally installed on the wireless communications terminal. Optionally, upon completion of the install process, the anti-malware software 145 communicates to the anti-malware software update server 125 the successful update.

From now on, the wireless communications terminal is protected against the new type(s) of malware.

The method according to the present invention allows keeping automatically updated OTA an anti-malware software resident in a wireless communications terminal without generating unnecessary traffic, thus reducing both the costs on the user's side and the burden on the operator's network side: in particular, no traffic is generated when there are no updates available.

In particular, the exploitation of the CB platform for distributing the catalogue of the available anti-malware software versions avoids the necessity for the wireless communications terminal to periodically perform a polling to the anti-malware software update server 125 for ascertaining the availability of updates.

The method is totally transparent to the anti-malware software and the automatic update functionality thereof, which can thus be any commercially available software.

Although the present invention has been disclosed and described by way of an embodiment, it is apparent to those skilled in the art that several modifications to the described embodiment, as well as other embodiments of the present invention are possible without departing from the scope thereof as defined in the appended claims.

For example, although in the foregoing the use of CB messages has been considered, this is not to be construed as a limitation of the present invention, which could exploit different kinds of signaling/messaging, like for example SMS messages (encrypted, if desired). However, the use of CB messages is preferred, since SMS messages exploit a store-and-forward procedure that can substantially delay the sending of the updated version information to the subscribed wireless communications terminals, particularly in case of a high number of subscribers.

It is also possible the automatic downloading to the wireless communications terminals not only of the catalogue of available updates, but also of the updated versions themselves. In this way, when the anti-malware software running in the wireless communications terminal ascertains the existence of a more recent anti-malware software version, it does not need to connect to the anti-malware software update server in the mobile telephony network, but again connects (in a totally transparent way) to the SCWS integrated in the SIM card, and the transaction takes place totally within the wireless communications terminal, thus avoiding significant traffic.

Moreover, while the above description has made specific reference to an anti-malware software application, it is believed that the invention can be applied to any kind of software application installable on a wireless communications terminal, the application having the need of at least one update, or typically of regular updates.

The invention claimed is:

1. A method of automatically checking for updates of a software application installed in a wireless communications terminal configured for use in a wireless communications network in combination with a subscriber identity module, comprising:
   providing in the subscriber identity module a web server function, the software application configured to interact with the web server function;
   storing in the subscriber identity module a current catalogue identifying at least one version of the software application;
   when an update of the software application is available, notifying the wireless communications terminal so that information on availability of the update is made available to the web server function,
      wherein notifying the wireless communications terminal comprises exploiting a messaging function of the wireless communications network for sending the information on the availability of the update;
   transmitting the information on the availability of the update to the wireless communications terminal;
   using the information on the availability of the update and the current catalogue to construct an updated catalogue in the subscriber identity module;
   storing the updated catalogue in the subscriber identity module;
   when a predetermined event occurs, causing the software application to automatically send at least one update availability request to the web server function in the subscriber identity module,
      wherein the updated catalogue stored in the subscriber identity module is accessible without use of a mobile telephony network; and
   determining, based on the updated catalogue, whether the software application can be updated.

2. The method according to claim 1, wherein the messaging function comprises a cell broadcast message function.

3. The method according to claim 1, wherein notifying of the wireless communications terminal further comprises encrypting a message carrying the information on the availability of the update.

4. The method according to claim 3, further comprising providing in the subscriber identity module a message decryption function.

5. The method according to claim 1, wherein said information comprises a web address of the available update.

6. The method according to claim 1, wherein said information comprises a version identifier of the updated software application.

7. The method according to claim 1, wherein causing the software application to send at least one update availability request to the web server function comprises sending a hyper text transfer protocol request to the web server function.

8. The method according to claim 1, wherein the software application comprises an anti-malware software application.

9. A wireless communications terminal configured for a wireless communications network, comprising:
   a wireless communications terminal storing a software application, the wireless communications terminal configured to interact with a subscriber identity module, wherein:
   the subscriber identity module comprises a web server function, wherein the subscriber identity module is configured to store a current catalogue identifying at least one version of the software application;
   the software application is configured to interact with the web server function;
   the terminal is configured to receive notifications from the wireless communications network related to availability of an update of the software application by exploiting a messaging function of the wireless communications network for sending information,
      wherein the notifications comprise information on the availability of the update to the software application;
   the subscriber identity module is further configured to construct an updated catalogue using the current catalogue and the information on the availability of the update, and to store the updated catalogue are stored in the subscriber identity module;
   the software application is configured for sending to automatically send an update availability request to the web server function when a predetermined event occurs,
      wherein the update availability request accesses the updated catalogue stored in the subscriber identity module; and
   the terminal is further configured to determine whether the software application can be updated.

10. The terminal according to claim 9, wherein the notifications comprise cell broadcast messages.

11. The terminal according to claim 9, wherein the notifications comprise encrypted messages.

12. The terminal according to claim 11, further comprising a message decryption function in the subscriber identity module.

13. The terminal according to claim 9, wherein each notification comprises a web address of a respective available update.

14. The terminal according to claim 9, wherein each of said notifications comprises a version identifier of an updated software application.

15. The terminal according to claim 9, wherein the software application is configured for sending update availability requests to the web server function via a hyper text transfer protocol client.

16. The terminal according to claim 9, wherein the software application comprises an anti-malware software application.

17. A wireless communications network comprising at least one wireless communications terminal according to claim 9.

18. The wireless communications network according to claim 17, further comprising a software update distribution function configured for receiving software updates from a software updates producer/vendor external to the wireless communications network.

19. The wireless communications network according to claim 18, further comprising a messaging function configured for sending messages to wireless communications terminals, said messaging function being operatively connected to the software update distribution function, and the messages being configured for carrying information regarding availability of software application update.

20. The wireless communications network according to claim 19, wherein said messaging function comprises a cell broadcast function.

* * * * *